United States Patent [19]

Lettang

[11] Patent Number: 5,164,602

[45] Date of Patent: Nov. 17, 1992

[54] MACHINE GUIDANCE SYSTEM UTILIZING FIBER OPTICS

[75] Inventor: Hynek G. Lettang, Winston-Salem, N.C.

[73] Assignee: Westinghouse Electric Corp., Pittsburgh, Pa.

[21] Appl. No.: 749,243

[22] Filed: Aug. 23, 1991

[51] Int. Cl.$^5$ .................................... G01N 21/86
[52] U.S. Cl. ............................ 250/561; 250/227.11; 356/400
[58] Field of Search ............. 250/561, 227.21, 227.11, 250/548; 180/169; 356/141, 152, 400, 1, 5

[56] References Cited

U.S. PATENT DOCUMENTS

| | | | |
|---|---|---|---|
| 3,619,618 | 11/1971 | Thorn | 250/203 |
| 3,641,351 | 2/1972 | Hintringer et al. | 250/203 |
| 3,739,176 | 6/1973 | Thorn | 250/203 |
| 4,570,065 | 2/1986 | Pryor | 250/561 |
| 4,644,146 | 2/1987 | Wurster | 250/202 |
| 4,703,820 | 11/1987 | Reinaud | 180/169 |
| 4,706,773 | 11/1987 | Reinaud | 180/169 |
| 4,928,019 | 5/1990 | Tomikawa et al. | 250/561 |
| 4,967,064 | 10/1990 | Field et al. | 250/203 |

Primary Examiner—David C. Nelms
Assistant Examiner—K. Shami

[57] ABSTRACT

A machine apparatus with a laser guidance system, the apparatus having at least two elements each movable along a predetermined path, and a laser control system for controlling the position of each of said elements by use of a laser beam aligned to be modulated by the movement of such element so as to determine its position. A fiber optic network is used to couple light beams generated by one or more lasers to each element and to return a position-modulated laser light from each element to a central control unit. The system also preferably includes means for monitoring the alignment of the laser beam at each element, and making corrective adjustments in the case of any misalignment.

15 Claims, 2 Drawing Sheets

MACHINE GUIDANCE SYSTEM UTILIZING FIBER OPTICS

FIELD OF THE INVENTION

This invention relates to guidance systems for controlling apparatus movement, and in particular machine tool guidance systems using lasers and fiber optic communications networks for distributing light signals to predetermined locations on the machine.

DESCRIPTION OF THE PRIOR ART

In many machine tool applications position reading and processing accuracy remains an area needing substantial improvement. In machine tools, and in particular NC/CNC machines, there is a significant need to improve the capability for measuring position accurately. For example, with respect to a common NC/CNC lathe, the lathe is typically calibrated by setting up a temporary calibration laser, and comparing laser distance readings with actual machine travel readings. Since the resolution obtainable With a laser distance measuring arrangement is much greater than the machine readings, the machine readings are set to the laser readings in order to calibrate the machine. However, as is well known, such machines can quickly and easily fall out of accurate calibration. Thus, there remains a longfelt need in the art for a real time measurement system which can continually operate with the accuracy of a laser-style calibration arrangement.

The problems presented by the attempt to design a continual laser measurement system for a machine tool such as a lathe are formidable. Such machines have substantial vibration, and it is not feasible to mount a plurality of lasers at different positions on a lathe, for example for the purposes of maintaining alignment and position along several linear axes. Maintaining a laser accurately mounted on a moving piece is not practically feasible. Likewise, a system of mirrors and prisms mounted on a vibrating machine, in order to conduct and direct laser-generated light beams along different predetermined paths, would be expensive and so extensive that machine flexibility would suffer and the expense would be prohibitive. Further, transmission of beams to different locations would require complicated shielding, in order to inhibit extraneous interference with the optical paths. Accordingly, for a number of practical engineering and cost reasons, the capability of lasers for controlling distance and alignment of moving elements has not been readily extended to areas such as machine tools.

The prior art shows generally the use of lasers for distance measuring and for directing moving objects such as vehicles along predetermined paths. See, by way of example, U.S. Pat. Nos. 4,644,146; 4,703,820; 3,641,351; 3,619,618; 3,739,176; 4,706,773; and 4,967,064. Each of these patents discloses a system for guiding a machine or other object with a laser beam. Typical is U.S. Pat. No. 4,706,773 (Reinaud), wherein a laser is mounted atop a tractor or other type of vehicle, and the vehicle is guided along a predetermined path by a guidance system which involves directing the laser beam along the direction of motion of the vehicle toward a reflective target, and using the reflected beam to generate a position signal. These systems all suffer from one of the o disadvantages above noted, mainly that the laser is mounted directly on the moving part, which is subject to vibration. Also, they generally require additional techniques, such as beam scanning and rotating, in order to utilize a plurality of reflective targets for control purposes. While such bulky hardware may be applicable to certain large vehicle and machine applications, it is not suitable for smaller machine tools, particularly where alignment and distance tolerances are much more precise.

SUMMARY OF THE INVENTION

It is an object of this invention to provide a guidance or control system useful for machine tools and other objects having a plurality of elements moving along respective paths, wherein a plurality of position and alignment signals are generated using a laser-generated light source in combination with a fiber optic network for transmitting the laser-generated light to and from different locations.

It is another object of this invention to overcome the disadvantages of the prior art associated with laser guidance systems, and in particular to provide a laser guidance system applicable to moving machine parts subject to significant vibration, particularly where alignment and position are critical.

It is a still further object of this invention to provide a laser control system for computer controlled machines such as a CNC lathe.

In accordance with the above objects, there is provided a machine apparatus having operatively associated with it a laser source, which apparatus has at least two elements each movable along a respective path, and having a position and alignment control subsystem comprising the laser and a fiber optic network connecting light derived from the laser to a plurality of positions on the machine and from a plurality of locations on the machine to a CNC or similar processing unit, for continuous high resolution control of the machine operation. In a preferred embodiment, the output of a single laser is split into a plurality of laser beam signals, any one or all of which can be coupled in to fiber optic cables and each is routed to a predetermined location on the machine where the beam is directed toward a predetermined target for measurement or alignment purposes. Likewise, received optical signals which carry position or alignment information are coupled through fiber optics to the central control unit. In this way, any number of moving elements can be monitored for position and alignment, and the optical beams themselves can be maintained in alignment.

DESCRIPTION OF THE PREFERRED EMBODIMENT

The preferred embodiment is described with specific reference to a NC/CNC engine lathe. However, it is to be understood that the invention is applicable to other types of machine tools, and motorized elements and other systems involving one or more moving elements which are controlled to move along predetermined paths, both linear and curvalinear.

Figure 1:
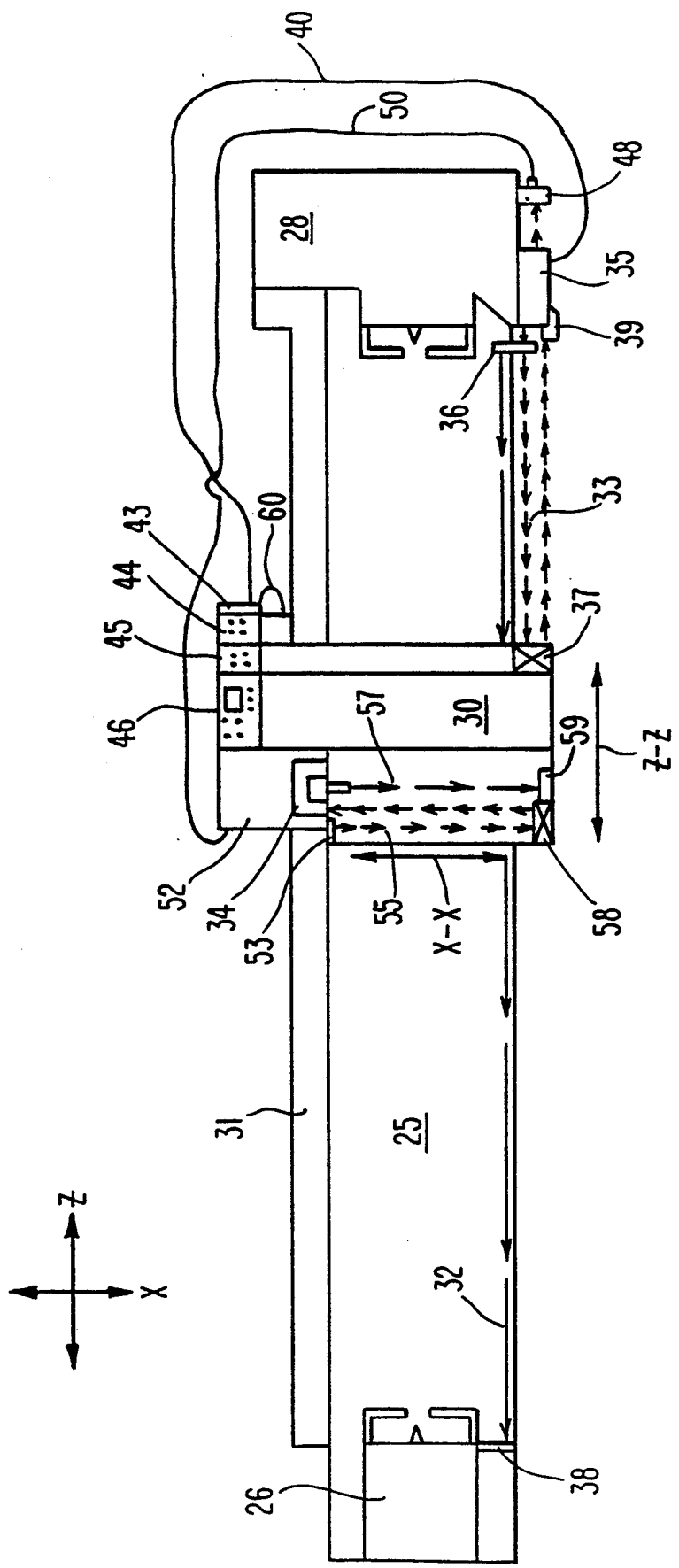
FIG. 1 shows a schematic diagram illustrating a top view of a lathe with laser and fiber optic control system indicated schematically.

Referring to the drawing of FIG. 1, there is shown schematically a lathe bed 25, having tail stock 26 at one end and head stock 28 at the opposite end. A cross slide 30 is illustrated, which is moved in the Z direction by drive mechanism 31 in a known manner. The slide carries tool holder 34, which is movable in the X direction and operates in a known manner. A CNC unit, illustrated at 44, controls the drive mechanism and thus location of the tool holder 34 in the X and Y direction, in accordance with prior art techniques.

The laser/fiber optic control system of this invention utilizes known techniques for determining distance and alignment. Such techniques are known in the art, and by themselves are not a part of this invention. Thus, it is known in the prior art to measure distance by directing a laser beam against a reflective target, and detecting the phase or other information of the reflected laser beam when it is received back at a light receiver. Typically, such systems use some form of modulation and de-modulation. Likewise, lasers are used for alignment, typically by having an arrangement of photodetectors positioned with respect to the beam path, such that the photodetectors produce an offset signal when the beam is out of alignment. These techniques are considered components of this invention, and are discussed below without further elaboration.

A laser device is indicated at 35, illustrated connected to the head stock. However, the laser can be mounted entirely separate from the machine, in order to minimize vibrational impact or susceptibility of optical or other types of interference. In the arrangement illustrated, a laser output is taken directly through the Z axis beam splitter 36, to generate a Z alignment beam 32 and a Z position beam 33. Alternately, an output from laser 35 can be coupled to splitter 36 with an optical fiber, particularly where the laser is not mounted on the machine. The alignment beam 32 is directed to a Z alignment detector 38, the output of which is suitably hardwired by a connected cable (not shown) to the input block 43. Another portion of the beam split by X beam splitter 36 is directed against Z position reflector 37, the reflected beam being detected by Z position receiver 39. The received optical beam is coupled by the Z optical fiber cable 40 to the input block 43, as illustrated.

Another light output is illustrated as being taken from the laser 35 and coupled through X optical coupler 48 to X optical fiber cable 50. It is to be noted that this light signal could alternately be taken from a beam splitter and then coupled with the fiber 50. The optical fiber cable 50 transmits light to decoupler 52, from which it passes through X beam splitter 53 to generate the X position beam 55 and the X alignment beam 57. The X position beam is directed toward the X reflector 58 and the reflected return signal is picked up by a receiver (not shown) and coupled through cable 60 to input block 43. Likewise, the alignment beam 57 is directed against X alignment detector 59, and the output signal from it is likewise connected by a cable, not shown, to the input block. If it is detected that a beam is out of alignment, a message is generated to alert an operator; alternately the machine can be equipped with alignment means for correcting the alignment, e.g., by moving a beam splitter.

While a preferred embodiment has been illustrated for controlling movement along separate or orthogonal linear axes, it is to be noted that the system of this invention is not so limited. Movement, if linear, can be along axes of any relative angles within a three-dimensional arrangement. Further, any number of elements can be controlled from either a single laser and a beam splitter, or multiple lasers, the light sources being located at any stable position where the are not subject to the detrimental effects of vibration. By use of a fiber optic network of optical fibers, each fiber having an associated coupler for coupling laser light into it and a decoupler for extracting light out of it, stable light sources can be aligned at multiple positions with respect to the tool system. Note that fiber cables 40, 50, 50 are shown schematically, and that in practice the cables are attached to the machine in a way so that they do not obstruct machine operation or movement in any manner. Problems due to vibration are minimized by mounting the laser on a solid foundation on or off the machine; securely fastening the beam splitters and/or decouplers that decouple light from the cables; and the alignment means for holding the beams aligned.

Figure 2:
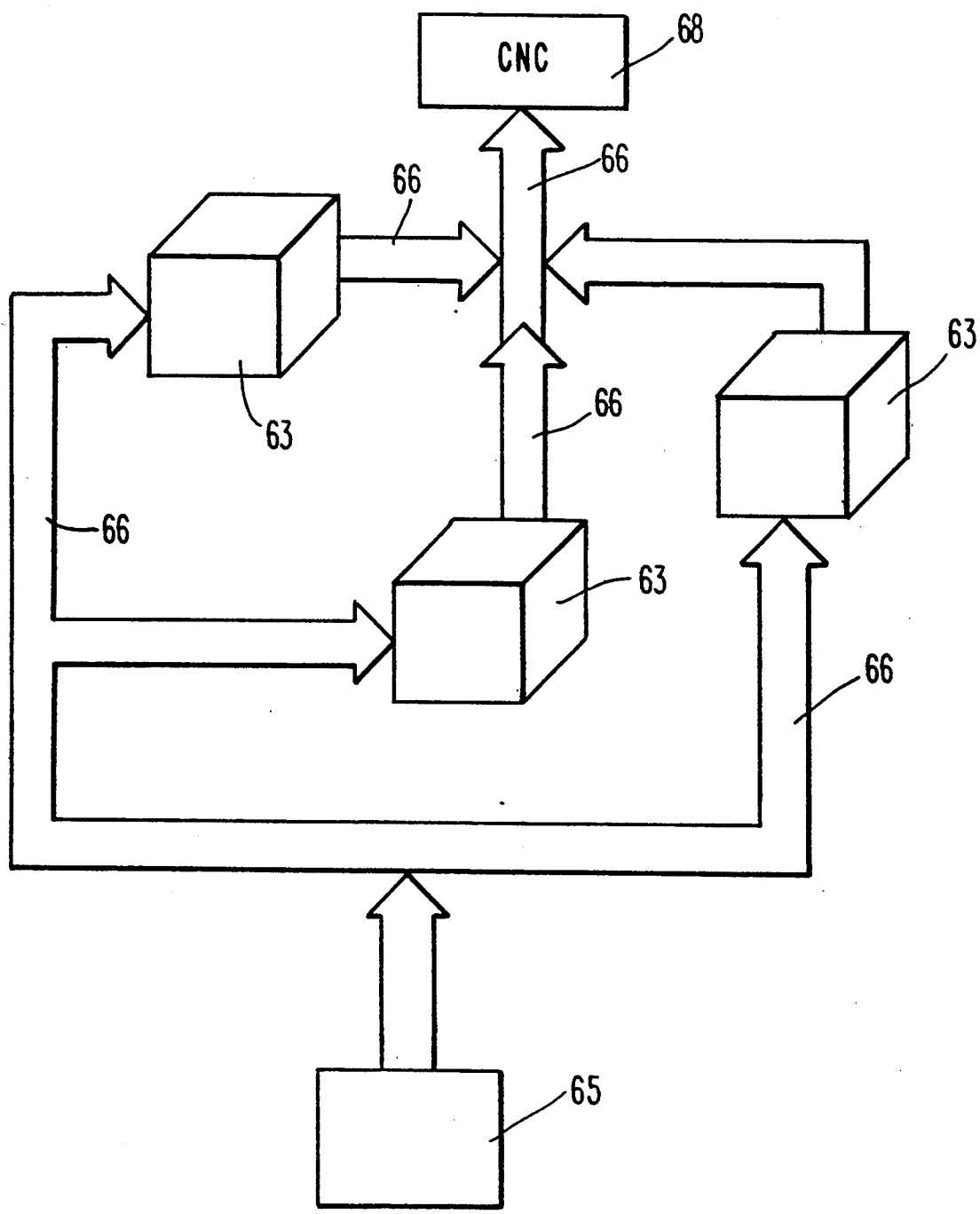
FIG. 2 is a schematic drawing showing the invention applied to a plurality of separate but interdependent elements or machines.

Further, it is within the scope of this invention to provide coordinated position control of a plurality of separate moving elements, e.g., machines, vehicles, carriers, etc. As seen in FIG. 2, an industrial system comprises plural moving elements 63 which must be coordinated. Each element may be moved within two or three dimensions, and the positions of the elements may be interdependent, such that they must be controlled relative to each other. In this arrangement, a central laser beam generating source is used for generating one or more light beams which are networked through a fiber optic network 66 to each such element, and return signals are returned through the network to a CNC unit or other appropriate computerized control 68. The control signals generated by the computer control unit are in turn outputted and connected through conventional cables to drive mechanisms related to each movable element, to provide coordinated control. Thus, the position of a first of the elements may be used by control 68 in determining the position of a second. Alternately, each element 63 may be a stand-alone machine, such as a lathe.

I claim:

1. Machine apparatus with a laser guidance system, said apparatus having at least two elements each movable along a respective predetermined path, said guidance system comprising:

a laser source for generating light outputs;

first position means operatively connected to said laser and employing a first light beam therefrom for generating a position signal reflective of the position of a first of said elements;

second position means operatively connected to said laser and employing a second light beam therefrom for generating a position signal reflective of the position of the second of said elements;

alignment means operatively connected to said laser and employing light beams therefrom for monitoring the alignment of said first and second beams;

control means receiving light output signals from each of said first and second position means for controlling movement of said first and second elements; and transmission means for transmitting laser light from said laser to each of said position means and for transmitting output signals from each of said means to said control means, said transmission means comprising a plurality of optical fibers, communicating light beams derived from said laser.

2. The machine apparatus as described in claim 1, wherein said transmission means comprises means for deriving said first and second light beams from said laser.

3. The machine apparatus as described in claim 2, wherein said transmission means comprises means for coupling light output from said laser into at least one optical fiber, and decoupling means for extracting light from said optical fiber.

4. The machine apparatus as described in claim 1, wherein said apparatus comprises a lathe, the first of said elements being movable along a first linear axis and the second of said elements being movable along a second axis orthogonal to said first axis, and wherein said control means receives light output signals carrying information reflective of the position of each of said elements.

5. The machine apparatus as described in claim 4, wherein said control means comprises means for controlling the alignment of each of said first and second beams.

6. A control system for control of a plurality of moving elements, each of said elements being movable along at least one axis, comprising:
 a laser source for generating a plurality of laser beams;
 position monitoring means operatively connected to each of said elements, each having means for receiving a laser light signal and for generating therefrom a laser signal carrying position information;
 a control processor for processing position signals from each of said elements and generating control signals for controlling the position of each respective element; and
 a fiber optic network for transmitting laser light signals from said laser source to each of said elements and for transmitting position modulated light signals from each of said elements to said control processor.

7. The control system as described in claim 6, further comprising means operatively connected to each element for monitoring the alignment of the laser position beam associated with such element.

8. The control system as described in claim 7, comprising means for adjusting any misalignment at any of said elements.

9. The control system as described in claim 8, wherein said moving elements are interdependent, and said control processor controls the position of at least one of said elements as a function of the sensed position of another of said elements.

10. Machine apparatus with an element movable in two directions, said apparatus having a control system for controlling movement of said element, said system comprising first position means for detecting movement in a first of said directions and second position means for detecting movement in a second of said directions, and processor means for processing position data and controlling the position of said element, characterized by
 a laser source for providing a plurality of light beams, first optical coupling means for coupling a light beam from said source to each of said first and second position means, said first coupling means including at least one optical fiber and second coupling means including optical fibers for coupling light beams carrying position data from each of said first and second position means to said processor means.

11. The machine apparatus as described in claim 10, comprising alignment means operatively connected to said laser and employing light beams therefrom for monitoring the alignment of the beam coupled to each of said first and second position means.

12. The machine apparatus as described in claim 11, further comprising means for controlling the alignment of each of said first and second beams.

13. The apparatus as described in claim 10, wherein said apparatus is a lathe.

14. The apparatus as described in claim 13, wherein said laser source is mounted to the head stock of the lathe.

15. The apparatus as described in claim 10, wherein said laser source is mounted separate from any vibrating part of said machine apparatus.

* * * * *